United States Patent
Kim et al.

(10) Patent No.: US 11,573,024 B2
(45) Date of Patent: Feb. 7, 2023

(54) SERVER AND METHOD FOR CONTROLLING MULTIPLE AIR CONDITIONING UNITS

(71) Applicant: Samsung Electronics Co., Ltd., Suwon-si (KR)

(72) Inventors: Junhyung Kim, Suwon-si (KR); Dongkeon Kong, Suwon-si (KR); Kyungjae Kim, Suwon-si (KR); Kwanwoo Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/119,341

(22) Filed: Dec. 11, 2020

(65) Prior Publication Data
US 2021/0180822 A1 Jun. 17, 2021

(30) Foreign Application Priority Data
Dec. 12, 2019 (KR) .......................... 10-2019-0166080

(51) Int. Cl.
*F24F 11/56* (2018.01)
*F24F 11/65* (2018.01)
(Continued)

(52) U.S. Cl.
CPC .............. *F24F 11/56* (2018.01); *F24F 11/46* (2018.01); *F24F 11/65* (2018.01); *H04L 67/125* (2013.01);
(Continued)

(58) Field of Classification Search
CPC .. F24F 11/56; F24F 11/46; F24F 11/65; F24F 2120/10; F24F 2140/60; F24F 11/30; F24F 11/47; H04L 67/125
See application file for complete search history.

(56) References Cited

U.S. PATENT DOCUMENTS 6,510,835 B1 * 1/2003 Mizuno ................. F02D 41/307
                                                                      123/305
7,204,093 B2    4/2007 Kwon et al.
(Continued)

FOREIGN PATENT DOCUMENTS

GB          2561495 A    10/2018
JP     2006-029694 A    2/2006
(Continued)

OTHER PUBLICATIONS

International Search Report dated Mar. 22, 2021, issued in International Patent Application No. PCT/KR2020/017937.
(Continued)

*Primary Examiner* — Alicia M. Choi
(74) *Attorney, Agent, or Firm* — Jefferson IP Law, LLP

(57) ABSTRACT

A server and a controlling method of a server are provided. The server includes a communication interface, a memory configured to store priorities of each of a plurality of spaces, and a processor configured to control a plurality of air conditioners arranged in the plurality of spaces, and the processor may, based on a total power usage of the plurality of air conditioners exceeding a first threshold value, control the plurality of air conditioners to operate in a power peak control mode to reduce the total power usage, and based on the total power usage being less than a second threshold value while operating in the power peak control mode, control the plurality of air conditioners to sequentially switch to a general mode according to the priority.

12 Claims, 9 Drawing Sheets

(51) Int. Cl.
*H04L 67/125* (2022.01)
*F24F 11/46* (2018.01)
*F24F 120/10* (2018.01)
*F24F 140/60* (2018.01)

(52) U.S. Cl.
CPC ....... *F24F 2120/10* (2018.01); *F24F 2140/60* (2018.01)

(56) References Cited

U.S. PATENT DOCUMENTS

| | | | |
|---|---|---|---|
| 2008/0178615 A1* | 7/2008 | Yoon | F24F 3/06 62/79 |
| 2012/0023977 A1* | 2/2012 | Kim | H02J 3/14 62/89 |
| 2012/0296485 A1 | 11/2012 | Kambara et al. | |
| 2015/0214768 A1* | 7/2015 | Matsuyama | G05B 15/02 700/296 |
| 2016/0195290 A1 | 7/2016 | Yonezawa et al. | |
| 2016/0290667 A1* | 10/2016 | Tamaru | F24F 11/62 |
| 2016/0290673 A1* | 10/2016 | Park | F24F 11/70 |
| 2017/0159953 A1* | 6/2017 | Kim | G05B 19/048 |
| 2017/0328595 A1* | 11/2017 | Iwasaki | F24F 11/89 |
| 2020/0124307 A1* | 4/2020 | Ota | G05B 19/042 |

FOREIGN PATENT DOCUMENTS

| | | | | |
|---|---|---|---|---|
| JP | 2011-69577 A | * | 4/2011 | ............. F24F 11/02 |
| JP | 5530256 B2 | | 6/2014 | |
| JP | 5748371 B2 | | 7/2015 | |
| JP | 2017-096529 A | | 6/2017 | |
| JP | WO2017/145301 A1 | | 3/2018 | |
| KR | 10-2005-0074825 A | | 7/2005 | |
| KR | 10-0565486 B1 | | 3/2006 | |
| KR | 10-2010-0051459 A | | 5/2010 | |
| KR | 10-1495159 B1 | | 2/2015 | |
| KR | 10-2017-0059130 A | | 5/2017 | |
| KR | 10-1847540 B1 | | 5/2018 | |
| KR | 10-2018-0111177 A | | 10/2018 | |

OTHER PUBLICATIONS

Braun, Reducing Energy Costs and Peak Electrical Demand through Optimal Control of Building Thermal Storage, 1990.

Agdougui et al., Peak Load Reduction in a Smart Building Integrating Microgrid and V2B-Based Demand Response Scheme, IEEE Systems Journal, vol. 13, No. 3, Sep. 2019.

Braun et al., Demonstration of Load Shifting and Peak Load Reduction with Control of Building Thermal Mass, 2002.

* cited by examiner

SERVER AND METHOD FOR CONTROLLING MULTIPLE AIR CONDITIONING UNITS

CROSS-REFERENCE TO RELATED APPLICATION(S)

This application is based on and claims priority under 35 U.S.C. § 119(a) of a Korean patent application number 10-2019-0166080, filed on Dec. 12, 2019, in the Korean Intellectual Property Office, the disclosure of which is incorporated by reference herein in its entirety.

BACKGROUND

1. Field

The disclosure relates to a server and a controlling method. More particularly, the disclosure relates to a server for efficiently managing a comfort level of a user and peak demand power by controlling an operation mode of an air conditioner and a controlling method thereof.

2. Description of Related Art

In general, an air conditioner is used for the purpose of cooling or heating a room, and can perform cooling or heating operation by changing the heat when a refrigerant is circulated to absorb ambient heat and the heat is released when the refrigerant is liquefied.

As an air conditioner has a lot of power consumption, a consumer who installs a plurality of air conditioners, when a peak demand power exceeds a target power, may use a power peak control method for reducing a peak demand power by forcing air conditioners being operated to a blowing mode or stopping the operation, for management of power.

According to a related-art power peak control method, each air conditioner is switched to a static, blowing, or cooing mode according to a predetermined sequence or cycle and operated. When each air conditioner is frequently switched to a blowing mode or a cooling mode, the amount of energy consumption can be increased due to the fall in cooling efficiency, and the thermal comfort level of a resident can also be reduced.

In the related art, when the power peak control is stopped and the mode is switched to a general control mode, there may be a problem in that the power consumption may rapidly increase, and the power peak control operation should be performed again.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a server and a controlling method thereof, which selects an air conditioner to be switched into a general mode by reflecting a spatial characteristic of a space in which an air conditioner is operated, and maintains an energy efficiency and minimizes fall in thermal comfort level of a resident by setting an operation mode, in order to solve a problem of increasing power consumption temporarily due to a manipulation of a resident at the time when the power peak control mode is switched to a general mode.

Additional aspects will be set forth in part in the description which follows and, in part, will be apparent from the description, or may be learned by practice of the presented embodiments.

In accordance with an aspect of the disclosure, a server is provided. The server includes a communication interface, a memory configured to store priorities of each of a plurality of spaces, and a processor configured to control a plurality of air conditioners arranged in the plurality of spaces, and the processor may, based on a total power usage of the plurality of air conditioners exceeding a first threshold value, control the plurality of air conditioners to operate in a power peak control mode to reduce the total power usage, and based on the total power usage being less than a second threshold value while operating in the power peak control mode, control the plurality of air conditioners to sequentially switch to a general mode according to the priority.

The processor may select an air conditioner to be switched to the general mode in a range of total power usage of the plurality of air conditioners being less than a first threshold value.

The processor may identify a predicted mean vote (PMV) corresponding to each space among the plurality of spaces.

The processor may select an air conditioner to be switched to the general mode so as to the PMV of a space corresponding to a high priority satisfies a preset value, based on the priority.

The processor may, based on a sum of the PMV of a first space and the PMV of a second space being constant, select an air conditioner to be switched to the general mode so that a difference between the PMV of the first space and the PMV of the second space is minimized.

The processor may identify a resident density for the plurality of spaces and identify a priority based on the identified resident density for each space.

The processor may receive a user input with respect to priorities of the plurality of spaces and identify a priority based on the received user input.

The processor may identify information about operation modes of each of the plurality of air conditioners in the power peak control mode, and select an air conditioner to be switched to the general mode based on the identified information about operation modes and the priority.

In accordance with another aspect of the disclosure, a method for controlling a server is provided. The method for controlling a server includes based on a total power usage of the plurality of air conditioners exceeding a first threshold value, operating the air conditioners to operate in a power peak control mode to reduce the total power usage, and based on the total power usage being less than a second threshold value while operating in the power peak control mode, sequentially switching the plurality of air conditioners to a general mode according to the priority of the plurality of spaces.

The switching to the general mode may include selecting an air conditioner to be switched to the general mode in a range of total power usage of the plurality of air conditioners being less than a first threshold value.

The method may further include identifying a predicted mean vote (PMV) corresponding to each space among the plurality of spaces.

The switching to the general mode may include selecting an air conditioner to be switched to the general mode so as to the PMV of a space corresponding to a high priority satisfies a preset value, based on the priority.

The switching to the general mode may include, based on a sum of the PMV of a first space and the PMV of a second space being constant, selecting an air conditioner to be switched to the general mode so that a difference between the PMV of the first space and the PMV of the second space is minimized.

The switching to the general mode may include identifying a resident density for the plurality of spaces and identifying a priority based on the identified resident density for each space.

The switching to the general mode may include receiving a user input with respect to priorities of the plurality of spaces and identifying a priority based on the received user input.

The method may further include identifying information about operation modes of each of the plurality of air conditioners in the power peak control mode, and the switching to the general mode may include selecting an air conditioner to be switched to the general mode based on the identified information about operation modes and the priority.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
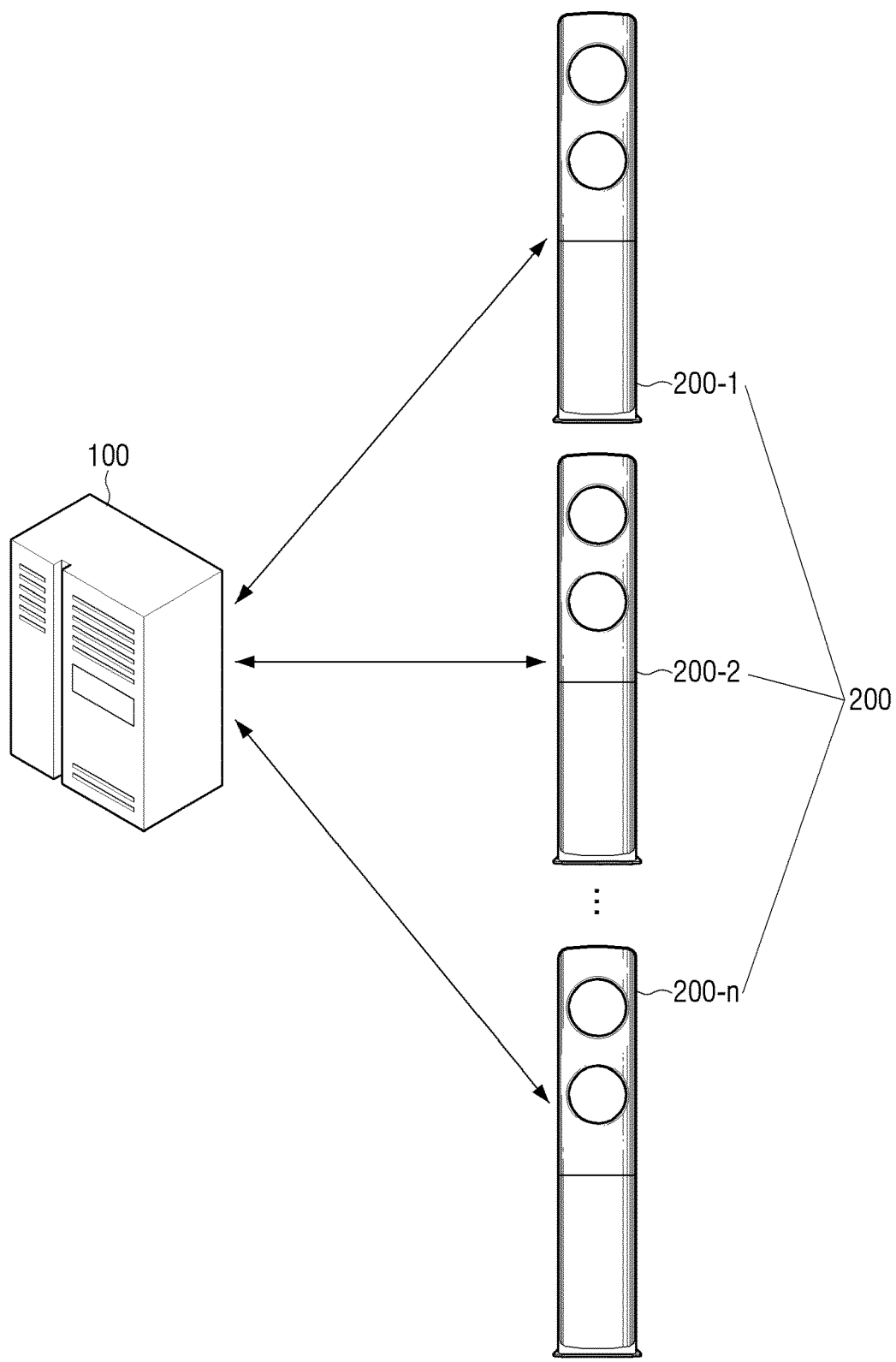
FIG. 1 is a diagram illustrating a power control system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It is to be understood that an element (e.g., a first element) is "operatively or communicatively coupled with/to" another element (e.g., a second element) is that any such element may be directly connected to the other element or may be connected via another element (e.g., a third element). On the other hand, when it is mentioned that an element (e.g., a first element) is "directly connected" or "directly accessed" to another element (e.g., a second element), it can be understood that there is no other element (e.g., a third element) between the other elements.

It is to be understood that the terms such as "comprise" or "consist of" may, for example, be used to designate a presence of a characteristic, number, operation, element, component, or a combination thereof, and not to preclude a presence or a possibility of adding one or more of other characteristics.

In the disclosure, components required for the description of each embodiment of the disclosure are described and thus, the embodiment is not necessarily limited thereto. Accordingly, some components may be changed or omitted and other components may be added. In addition, components may be disposed and arranged in different independent devices.

The peak demand power can refer to a power value when continuously used for 15 minutes with the same power value. In the disclosure, a cooling mode of an air conditioner is described for convenience of description, but when the air conditioner is operated in a heating mode, the same process and method can be applied.

The disclosure will be described in detail with reference to the drawings.

FIG. 1 is a diagram illustrating a power control system according to an embodiment of the disclosure.

Referring to FIG. 1, a power control system 1000 can include a server 100 and a plurality of air conditioners 200. The air conditioner 200 is an apparatus used for the purpose of cooling or heating a room. Although a stand-type air conditioner 200 is shown in FIG. 1, the embodiment is not limited thereto, and the air conditioner 200 may be implemented as a stand-type air conditioner, a wall-mounted air conditioner, a ceiling air conditioner, a mobile air conditioner, and a window-type air conditioner, or the like.

The server 100 can monitor an operating state of the plurality of air conditioners 200. Specifically, the server 100 can be connected to each of the plurality of air conditioners 200 and can identify a state of an air conditioner including an operation mode (e.g., a cooling and cooling mode or a blowing mode) of each of the plurality of the air conditioners

200. The cooling and heating mode can be used to perform the cooling and heating operation using a refrigerant included in the air conditioner 200.

The server 100 can identify the information of each of the plurality of air conditioners 200. The server 100 may identify information including position information of each air conditioner 200-1, ..., 200-$n$, desired setting temperature input to the air conditioner 200 by a resident, and power consumption of the air conditioner 200, or the like.

The server 100 can calculate the amount of power of each air conditioner 200 in operation based on the identified information of the plurality of air conditioners 200. The server 100 may calculate total power consumption by calculating the amount of power of each air conditioner 200 in real time. Alternatively, the server 100 may receive information on the amount of power consumption calculated from each air conditioner 200 in operation, and the server 100 can calculate total power consumption based on the received amount of power consumption.

The server 100 may be connected to each of the plurality of air conditioners 200, and may control operations of each air conditioner 200-1, 200-2, ..., 200-$n$. Specifically, the server 100 can set the desired set temperature of each air conditioner 200, and set the operation mode (e.g., cooling and heating mode or blow mode) of each air conditioner 200. The blowing mode may refer to a state where the air conditioner 200 does not operate in the cooling and heating mode, and the power consumption amount is relatively small compared to the air conditioner 200 operating in the cooling and heating mode.

The server 100 can control the air conditioner 200 so that a predicted mean vote (PMV) of a specific space satisfies a target value. The PMV means an expected average thermal sensation and can mean an index for evaluating a thermal comfort by integrating an effect of thermal environment of a resident. The PMV value can be classified into seven sections or numbers. Specifically, the PMV value corresponding to a state where a resident may feel pleasant or desired temperature may be 0, the temperature which is relatively low and a resident may feel cold may correspond to −3, and the temperature which is relatively high and a resident may feel hot may correspond to +3. The server 100 can manage a specific space comfortably by monitoring the PMV of a specific space.

The server 100 can control the air conditioner 200 based on the priority. Since the server 100 controls the air conditioner 200 based on the priority, the energy efficiency may be maintained, and fall in comfort level of a resident can be minimized. A detailed description related to the priority will be described below with reference to FIGS. 4 through 6.

The server 100 can control the air conditioner 200 to operate in a state where the total power consumption of the air conditioner 200 is less than or equal to a predetermined number. The server 100 can calculate the amount of power consumed by each air conditioner 200 in operation, thereby calculating total power consumption based thereon, and may control the operation mode of the air conditioner 200 so that the calculated total power consumption is less than or equal to a predetermined value.

According to an embodiment, a problem that the power consumption rapidly increases as the plurality of air conditioners 200 are switched to the cooling mode immediately after the power peak control is terminated can be prevented, and a problem that a resident's comfort level is continuously degraded can be prevented by a method of slowing the end point of the power peak control. According to one embodiment, an efficient energy management is possible by preventing degradation of comfort level of a resident based on a target comfort level according to a spatial priority, and blocking a drastic energy peak consumption which can occur at the end of the power peak control mode.

Figure 2:
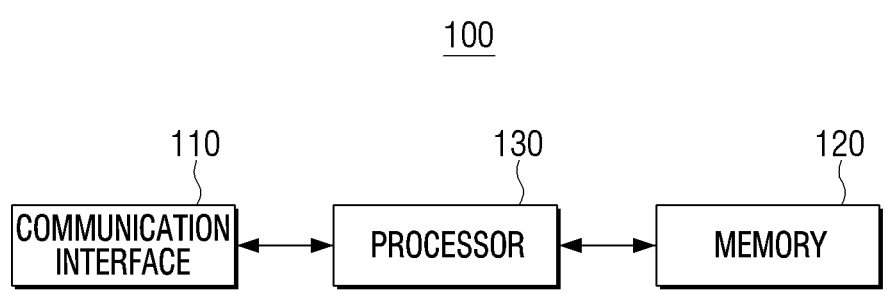
FIG. 2 is a block diagram briefly illustrating a configuration of a server according to an embodiment of the disclosure.

FIG. 2 is a block diagram briefly illustrating a configuration of a server according to an embodiment of the disclosure.

The server 100 is a device which may be connected to the air conditioner 200 for controlling the air conditioner 200 and may be implemented as a smartphone, a tablet personal computer (PC), a desktop PC, a laptop PC a netbook computer, a workstation, a personal digital assistant (PDA), a kiosk, or the like.

Referring to FIG. 2, the server 100 may include a communication interface 110, a memory 120, and a processor 130. However, the embodiment is not limited thereto and some configurations may be added or omitted depending on a type of the server 100.

The server 100 can communicate with the air conditioner 200 or an external device using the communication interface 110. That the communication interface 110 communicates with the air conditioner 200 or an external device may include communicating via a third device (e.g., a relay, a hub, an access point, a server, a gateway, etc.).

Specifically, the server 100 can receive information about the operation mode from the air conditioner 200 using the communication interface 110. For example, the communication interface 110 can receive information related to the operation mode of each air conditioner 200-1 ... 200-$n$ from the air conditioner 200, and the server 100 can perform real-time monitoring on the air conditioner 200 based on the information received through the communication interface 110. The operation mode can refer to an operation state of an air conditioner, and can refer to an operation state including information regarding a setting temperature, a wind direction, a wind speed, a wind quantity, etc. as well as a cooling and heating mode or a blowing mode.

According to an embodiment, the server 100 may receive power consumption amount from the air conditioner 200 using the communication interface 110.

The server 100 can directly or indirectly control the air conditioner 200 using the communication interface 110. For example, the server 100 can stop the operation of the air conditioner 200 by using the communication interface 110 and change the operation mode from the blowing mode to the cooling mode.

The communication interface 110 may communicate with an external device in addition to the air conditioner 200. The external device is a device capable of communication, and can include a smartphone, a tablet PC, a desktop PC, a laptop PC, a netbook computer, a workstation, a PDA, a kiosk, or the like.

The communication interface 110 can include various communication modules for performing communication with the air conditioner 200 or an external device. For example, the communication interface 110 may include a wireless communication module (not shown), an infrared module (not shown), and a broadcast receiving module (not shown).

Wireless communication (not shown) may include cellular communication using any one or any combination of the following, for example, long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM), and the like. According to an embodiment, the wireless communication may include, for example, at least one of Wi-Fi, Bluetooth, Bluetooth low energy (BLE), Zigbee, magnetic secure transmission, radio frequency (RF), or body area network (BAN).

The infrared module (not shown) is a module to transmit information in an infrared emitted to the air conditioner 200. In an embodiment, the infrared module may transmit infrared including user input information to the air conditioner 200 from the server 100.

The memory 120 may store instruction or data related to at least one another element of the server 100. The memory 120 may be implemented as a non-volatile memory, a volatile memory, a flash memory, a hard disk drive (HDD), a solid state drive (SSD), or the like. The memory 120 is accessed by the processor 130 and reading, writing, modifying, deleting, or updating of data by the processor 130 may be performed. In the disclosure, the term memory may include the memory 120, read-only memory (ROM) in the processor 130, random access memory (RAM), or a memory card (for example, a micro secure digital (SD) card, and a memory stick) mounted to the server 100. The memory 120 may store a program and data, or the like, to configure various screens to be displayed on a display region of the display 160.

The memory 120 can store various modules and programs to control the plurality of air conditioners 200 or to control the power of the air conditioner 200. Specifically, the memory 120 can store a peak control operation determination module (not shown), a space comfort management module (not shown), a control device/operation mode selection module (not shown), an air conditioning information collection module (not shown), and a space information collection module (not shown).

The peak control operation determination module can be a software module associated with a program that monitors the peak demand power amount in real time to determine whether to enter and exit the power peak control mode based on a target power value and a set power value. The peak demand power can mean the expected power value when continuously used for 15 minutes at the same power value. The target power value may be a value that is a starting reference of the power peak control mode, and the set power value can be a reference value which changes from the power peak control mode to a partial control mode.

The spatial comfort level management module can be a software module associated with a program that performs a function of managing a comfort level for a space in which the air conditioner 200 is arranged. Specifically, a module and a program for calculating a PMV for each space can be included. The PMV may refer to an estimated average thermal sensation, and may refer to an index which evaluates thermal comfort by integrating an effect of thermal environment of a resident.

The control device/operation mode selection module may be a software module associated with a program to perform a function such as setting a desired temperature, operation mode (e.g., cooling and heating mode, or blowing mode), intensity of wind, direction of wind, or the like, of each air conditioner 200.

The space and air conditioner information collection module may be a software module related to a program to perform a function to collect information of an operation state of the air conditioner 200, position of each air conditioner 200, temperature of a space where the air conditioner 200 is disposed, and priority by spaces.

The memory 120 may store information about a priority by a plurality of spaces. A description of priority by a plurality of spaces will be described with reference to FIGS. 4 to 6.

The processor 130 may be electrically connected to the communication interface 110 and the memory 120 and may control the overall operation and functions of the server 100. For example, the processor 130 can control hardware or software components connected to the processor 130 by driving an operating system or application program, and perform various data processing and operations. The processor 130 may load or process commands or data received from at least one of the other components into the volatile memory and store the various data in a non-volatile memory.

The processor 130 may be implemented as a dedicated processor (e.g., embedded processor) for performing a corresponding operation or a general-use processor (e.g., a central processing unit (CPU) or an application processor) capable of performing the operations using one or more software program stored in a memory device.

The processor 130 can control the air conditioner 200 using the communication interface 110 as well as the operation of the server 100 itself. Specifically, when the total power consumption of the plurality of air conditioners 200 is less than the set power value while the plurality of air conditioners 200 are operated in the power peak control mode, the processor 130 can control the plurality of air conditioners 200 to change the power peak control mode to the general mode.

The processor 130 can identify priority information corresponding to each of the plurality of spaces and select the air conditioner 200 to switch to a cooling mode based on priority information. The processor 130 may set the operation mode of the selected air conditioner 200 and control the air conditioner selected to operate in a set operation mode.

The priority information can be set by the processor 130. Specifically, the processor 130 can sense the number of residents in each of the plurality of spaces by using the sensor 150, identify the resident density on the basis of the number of residents detected by the processor 130, and set priority information based on the identified spatial resident density. The processor 130 may receive a user input for a plurality of spaces and identify priority information based on the received user input.

According to another embodiment, the processor 130 may identify priority information based on an operation record of an air conditioner for each of the plurality of spaces. Specifically, the processor 130 can identify an operation record of the air conditioner 200 corresponding to a plurality of spaces for a predetermined period and determine priority based on the identified operation records. For example, if the amount of use of the air conditioner 200 disposed in a second space is greater than or equal to the amount of use of the air conditioner 200 disposed in a first space and a third space, the second space can be set as the highest priority. The processor 130 may compare the usage of each space to determine priority, and can identify priority information. The usage amount can be the average power consumption of the air conditioner 200 disposed in each space for a period of time, or the total power consumption of the corresponding space.

The processor 130 can control the air conditioner 200 so that the total power consumption of the plurality of air conditioners 200 is maintained at a predetermined value or below. Specifically, the processor 130 can select the conditioner 200 to be switched to a cooling mode within a range where the total power consumption of the plurality of air conditioners 200 is less than the target power value. The processor 130 can identify the air conditioner 200 operated in a blowing mode and can control power consumption such that an increase amount of power is calculated when the air conditioner 200 is switched to a cooling mode, so that the total power consumption is maintained within a range less than the target power value.

The processor 130 can identify information about the operation mode of each of the plurality of air conditioners 200 in the power peak control mode, and select the air conditioner 200 to be switched to the cooling mode based on the identified information on the operation mode and priority information. The above-described features will be described in detail with reference to FIGS. 4 to 6.

The processor 130 can identify a PMV corresponding to each of the plurality of spaces. The PMV is the estimated average thermal sensation and can be an index for evaluating a thermal comfort by integrating effects by a thermal environment of the resident. The processor 130 can calculate the PMV based on an indoor environment such as temperature, humidity, average radiant temperature, airflow rate, clothing amount, activity of resident, or the like.

The processor 130 can select an air conditioner to be switched to a cooling mode so that the PMV can satisfy a preset value from a space which corresponds to a high priority based on the priority information. Alternatively, the processor 130 can select the air conditioner 200 to be switched to the cooling mode so that the difference between the PMV in the first priority space and the PMV in the second priority space is minimized when the sum of the PMV of the first rank space and the PMV of the second rank space is constant. The above-described features will be described in detail with reference to FIGS. 4 to 6.

The processor 130 can identify information on the operation mode of each of the plurality of air conditioners 200 in the power peak control mode. That is, the processor 130 can identify whether each air conditioner 200 is operating in a blowing mode, in a cooling mode, and a static state, and the processor 130 can select an air conditioner to be switched to a cooling mode based on the identified operation mode. For example, the air conditioner 200 operating in the cooling mode in the power peak control mode cannot switch to a cooling mode, and when the air conditioner 200 in the blowing mode is switched to the cooling mode, an increase in the total power consumption can be smaller than the air conditioner 200 in the static state. Accordingly, the processor 130 can identify information about the operation mode of each of the air conditioners 200 in the power peak control mode and efficiently select the air conditioner 200 to be switched to the cooling mode based on the identified operation mode.

Figure 3:
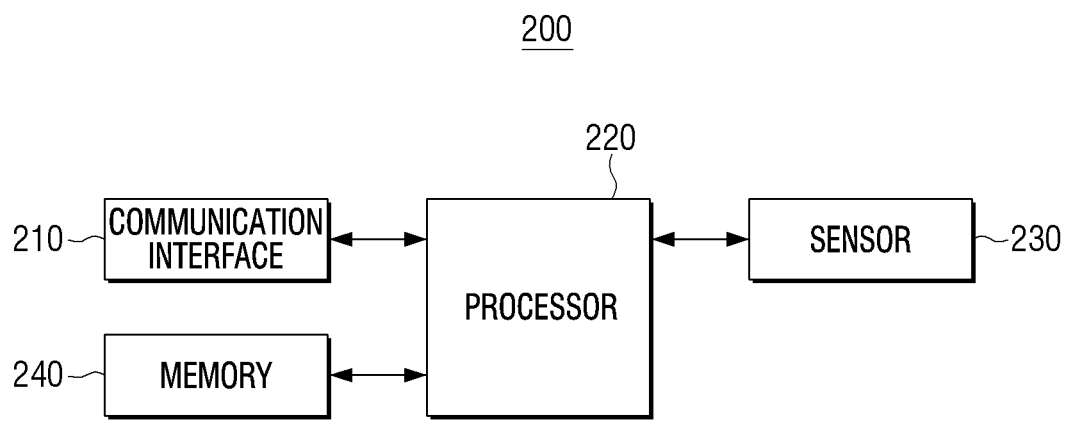
FIG. 3 is a block diagram illustrating a configuration of an air conditioner in detail according to an embodiment of the disclosure.

FIG. 3 is a block diagram illustrating a configuration of an air conditioner in detail according to an embodiment of the disclosure.

Referring to FIG. 3, the air conditioner 200 may include a communication interface 210, a processor 220, a sensor 230, and a memory 240. The embodiment is not limited thereto, and some configurations of the air conditioner 200 may be added or omitted in actual implementation.

The air conditioner 200 can communicate with the server 100 or the external device using the communication interface 210. Communication of the communication interface 210 with the server 100 or the external device may include communication via a third device (e.g., a relay, a hub, an access point, a server, a gateway, etc.).

Specifically, the air conditioner 200 can transmit information on the operation mode to the server 100 using the communication interface 210. For example, the communication interface 210 can transmit information related to the operation mode of the air conditioner 200. According to one embodiment of the disclosure, the air conditioner 200 can transmit power consumption to the server 100 by using the communication interface 210.

The air conditioner 200 can receive commands for controlling the air conditioner 200 from the server 100 using the communication interface 210. For example, the server 100 can transmit a command to stop the operation of the air conditioner 200, and the communication interface 210 can receive the command from the server. In addition, the operation mode may be changed from a blowing mode to a cooling mode according to the command received by the communication interface 210 from the server 100.

The communication interface 210 may communicate with an external device, in addition to the server 100. The external device is a device which is communicable and may include a smartphone, a tablet personal computer (PC), a desktop PC, a laptop PC, a netbook computer, a workstation, a personal digital assistant (PDA), a kiosk, or the like.

The communication interface 210 may include various communication modules to perform communication with the server 100 or an external device. For example, the communication interface 210 may include a wireless communication (not shown), an infrared module (not shown), and a broadcasting receiving module (not shown).

Wireless communication (not shown) may include cellular communication using any one or any combination of the following, for example, long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM), and the like. According to an embodiment, the wireless communication may include, for example, at least one of Wi-Fi, Bluetooth, Bluetooth low energy (BLE), Zigbee, magnetic secure transmission, radio frequency (RF), or body area network (BAN).

The infrared module (not shown) is a module for transmitting information included in infrared rays emitted to the air conditioner 200. In one embodiment, an infrared module can receive infrared rays including user input information from an input interface (not shown), such as a remote controller (not shown).

The processor 220 may be electrically connected to the air conditioner 200 and may control the overall operation and functions of the air conditioner 200. The processor 220 can control the operation and functions of the air conditioner 200 based on the control commands received from the server 100.

The processor 220 may operate the air conditioner in an operation mode (e.g., cooling/heating mode or blowing mode) of the air conditioner 200, and may operate the air conditioner 200 according to desired setting temperature received from a user.

The processor 220 may be implemented as a dedicated processor (e.g., embedded processor) or a general purpose processor (e.g., a central processing unit (CPU) or application processor) capable of performing the operations by executing one or more software programs stored in a memory device.

The sensor 230 may detect an object and a motion in a space. The sensor 230 may detect an object and a motion by detecting physical changes such as heat, light, temperature, pressure, sound, or the like.

For example, the sensor 230 may include a Lidar sensor, a Radar sensor, an infrared sensor, an ultrasound sensor, a radio frequency (RF) sensor, and a camera, and in particular, may be a motion detection sensor. Specifically, the motion detection sensor is a kind of an active sensor and may use a method for measuring a signal that is returned by transmitting a specific signal.

The sensor 230 may be connected to the server 100 and the air conditioner 200 by wire or wirelessly and transmit information about a detected object to the server 100. The sensor 230 may be installed on a position where a plurality of air conditioners 200 are spaced apart from each other and cover an entire space where the air conditioner 200 is present.

In implementation, a part of the sensor 230 may be included in an external device and communicate with the server 100 and the air conditioner 200 and an external device may perform cooperative detection of each other.

The memory 240 may store various modules and programs to control the air conditioner 200. The memory 240 may store data related to an operation mode of the air conditioner 200.

The memory 240 may store a command or data related to at least one other elements of the air conditioner 200. The memory 240 may be implemented as a non-volatile memory, a volatile memory, a flash memory, a hard disk drive (HDD), a solid state drive (SSD), and the like. The memory 120 is accessed by the processor 130 and reading, writing, modifying, deleting, or updating of data by the processor 130 may be performed. The memory 240 may store a program, data, and the like, to configure various screens to be displayed on a display area of the display 160.

The air conditioner 200 can further include a display (not shown). The display can display various information according to the control of the processor 220. In particular, the display can display status information including an operation state of an air conditioner by the control of the processor 130, such as a wind direction, a wind speed, and a cooling and heating mode, or the like.

The display may be implemented as various types of displays such as a liquid crystal display (LCD) panel, light emitting diode (LED), organic light emitting diode (OLED), liquid crystal on silicon (LCoS), digital light processing (DLP), and the like. In the display (not shown), a backlight unit, a driving circuit which may be implemented as a format such as an a-Si TFT, low temperature poly silicon (LTPS) TFT, organic TFT (OTFT), and the like, may be included as well. The display may be combined with a touch panel and may be implemented with a touch screen, but this is merely and the display can be implemented in a diverse manner.

The air conditioner 200 may further include an input interface (not shown). The input interface may receive a user input to control the air conditioner 200. The input interface may include a touch panel for receiving a user touch such as a hand, etc., a button to receive a user manipulation, or the like. The input interface may be implemented with another input device (e.g., a virtual keyboard, a mouse, a motion inputter, especially a remote control).

Figure 4:
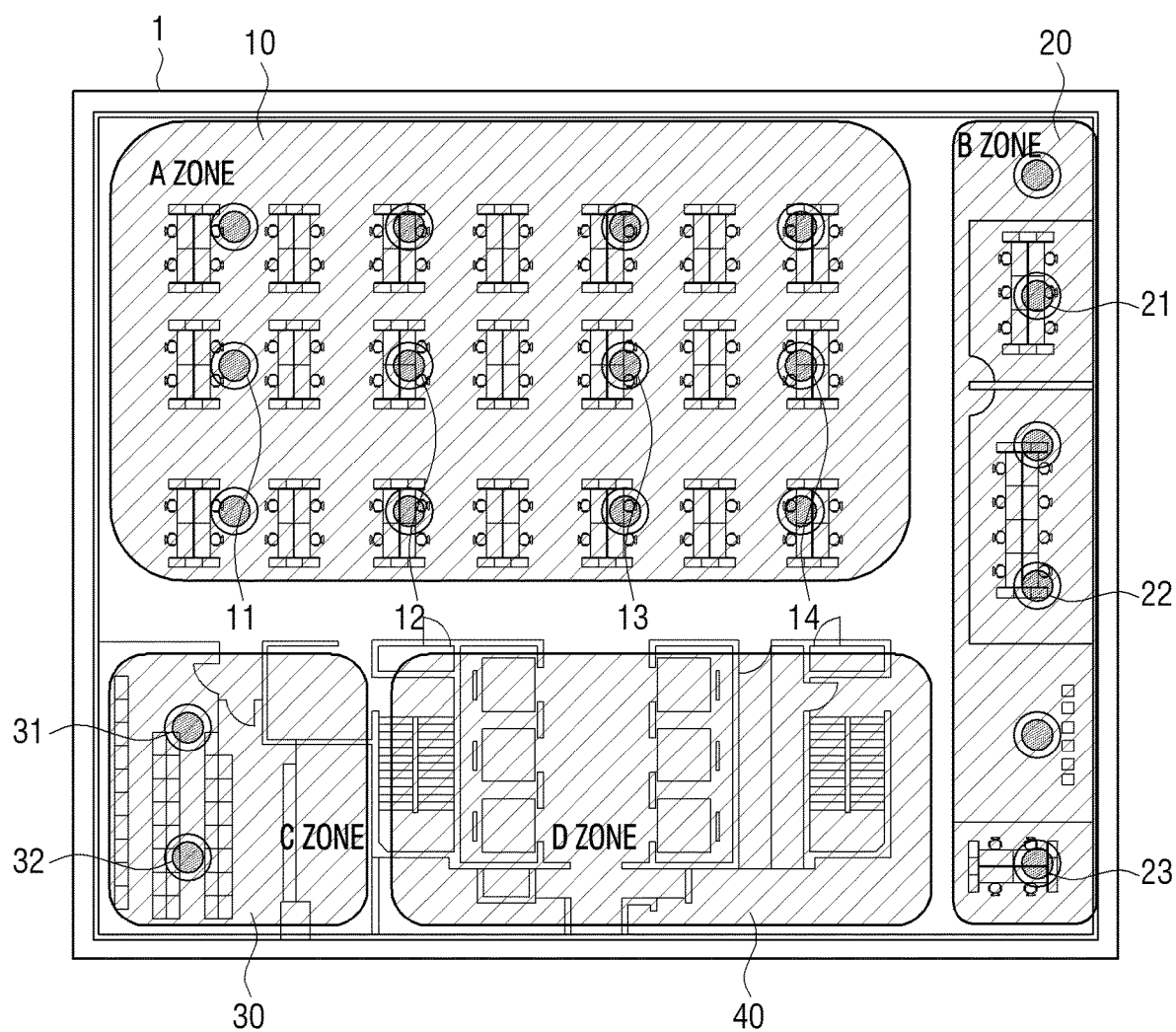
FIG. 4 is a plot plan of a plurality of air conditioners according to an embodiment of the disclosure.

FIG. 4 is a plot plan of a plurality of air conditioners according to an embodiment of the disclosure.

Referring to FIG. 4, a divided plurality of spaces of A zone 10, B zone 20, C zone 30, and D zone 40 are shown. The air conditioner 200 is arranged in a plurality of spaces 1, wherein twelve air conditioners are provided in the A zone 10, six air conditioners are shown in the B zone, and two air conditioners are shown in the C zone. FIG. 4 is an illustration for describing a working space in a general building. In the implementation, the number of the air conditioner 200 may be less than or greater than the air conditioner 200 shown in FIG. 4. Referring to FIG. 4, a drawing in which a plurality of spaces 1 are divided into four parts is illustrated, but the number of divided spaces can be smaller or greater.

The server 100 may divide the plurality of spaces 1 into A zone 10, B zone 20, C zone 30, and D zone 40 according to a use or a feature of the space according to the feature information of each space. The server 100 may divide a space in accordance with a user input to group the air conditioner 200 disposed in the plurality of spaces 1.

The A zone 10 may be a general working space, the B zone 20 may be a reception room or a conference room, the C zone 30 may be an office pantry or a warehouse, and the D zone 40 can be a public space in which an operation or an elevator is present. The C zone 30 can be a space in which equipment and supplies are stored and a resident is not residing and thus is not relatively sensitive to the comfort level, and the D zone 40 can be a public use space in a building and may not be subject to control. The A zone 10 and the B zone 20 is a place where a resident is residing, or a space in which many people are simultaneously placed in a narrow space and thus, comfort level may be relatively important.

The server 100 can group and store a plurality of air conditioners according to the spatial characteristic information of the plurality of spaces 1. For example, the server 100 may group twelve air conditioners present in the A zone 10 and store location information on the air conditioner present in the A zone 10, consumption power according to the operation of the air conditioner, and the like. Air conditioners corresponding to 11, 12, 13, 14 may be in the A zone 10, while air conditioners corresponding to 21, 22, 23 may be in the B zone 20, and air conditioners corresponding to 31 and 32 may be in the C zone 30.

The server 100 can monitor the operation of the air conditioner 200 included in the plurality of spaces 1. Specifically, the server 100 can monitor whether the operation mode of the air conditioner 200 included in the plurality of spaces 1 is operated in a cooling mode.

For example, referring to FIG. 4, all air conditioner 200 included in a plurality of spaces 1 is operated in a cooling mode, and the server 100 can identify a state in which all air conditioners 200 included in the plurality of spaces 1 are operated in a cooling mode.

The server 100 may operate the air conditioner 200 in a power peak control mode when the total power consumption of the air conditioner 200 exceeds a target power.

Figure 5:
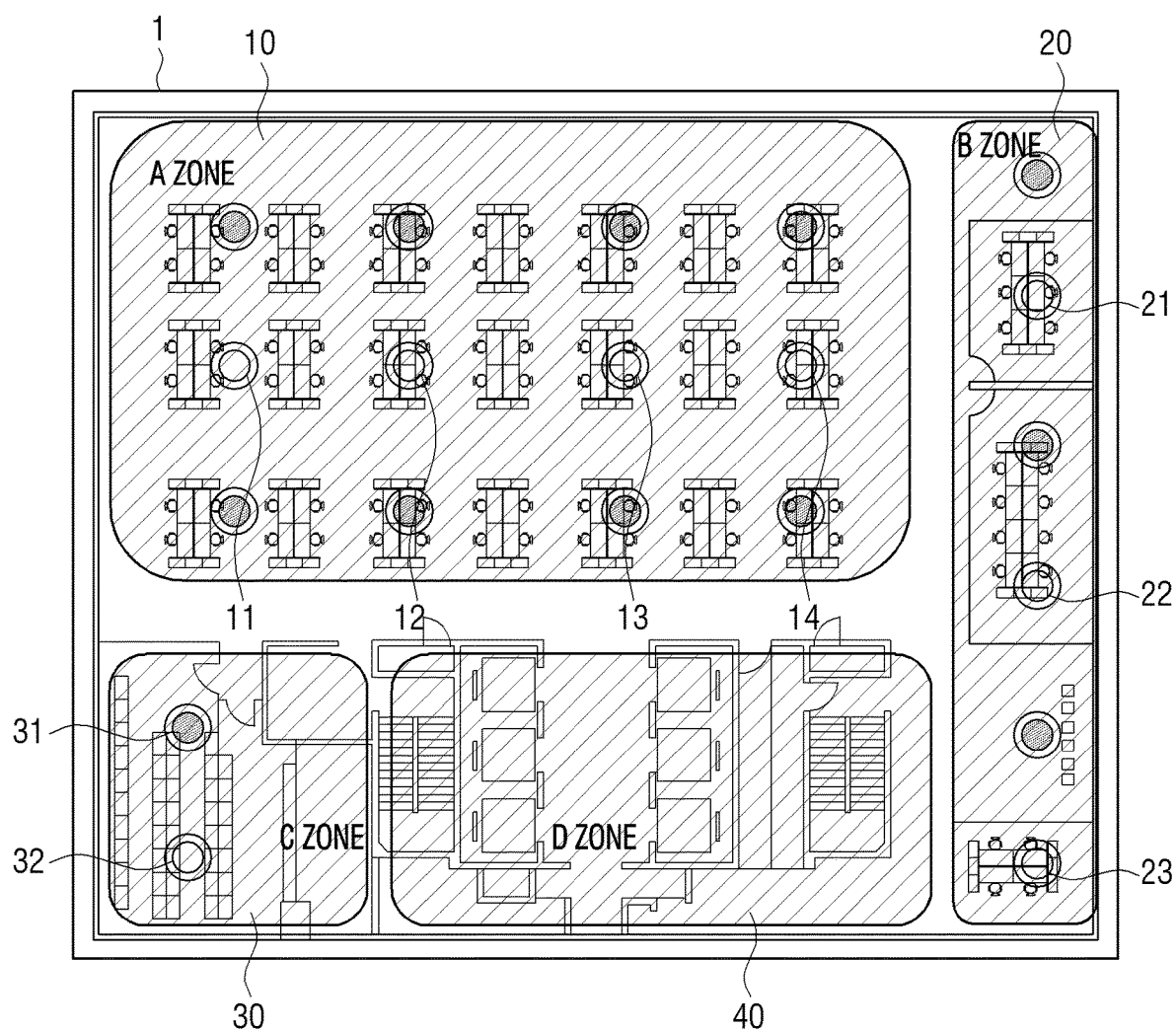
FIG. 5 is a diagram illustrating a power peak control mode according to an embodiment of the disclosure.

FIG. 5 is a diagram illustrating a power peak control mode according to an embodiment of the disclosure.

Referring to FIG. 5, the air conditioner 200 included in the plurality of spaces 1 is operated in a power peak control mode. The power peak control mode may refer to a mode in which the server 100 limits control of the entire air conditioners and operates the air conditioner.

The server 100 may control the air conditioner 200 to operate some air conditioners in a stopped state or a blowing mode and restrict a control right so that a resident cannot change the air conditioner to a cooling mode.

As illustrated in FIG. 4, the server 100 can operate in a power peak control mode changing the air conditioner 200 to a stopped state or blowing mode if, while all air conditioners 200 included in the space operate in a cooling mode, total power usage (or peak demand power) exceeds the target power value. The peak demand power can mean the expected power value when continuously used for 15 minutes at the same power value.

The driving method and procedure of the power peak control mode can be various. In the disclosure, it is assumed that a 40% of the entire air conditioner 200 in the space can be continuously converted into a blowing mode and the control authority for the converted air conditioner is restricted.

As illustrated in FIG. 5, the server 100 may control the plurality of air conditioners 200 so that, among the plurality of air conditioners 200, air conditioners corresponding to 11, 12, 13, 14 are changed to a blowing mode in the A zone 10, the air conditioners corresponding to 21, 22, 23 are changed to a blowing mode in the B zone 20, and an air conditioner corresponding to 32 is changed to a blowing mode.

The server 100 can reduce total power consumption or peak demand power by operating a plurality of air conditioners 200 in a power peak control mode. When the total power consumption of the plurality of air conditioners 200 is lower than the set power value, the server 100 can control the air conditioner 200 to change the power peak control mode to partial control modes.

The partial control modes can mean that the server 100 sequentially swifts the plurality of air conditioners 200 to the general mode according to the priority. The general mode can refer to a state or a mode of a general air conditioner 200 capable of controlling the air conditioner 200.

Figure 6:
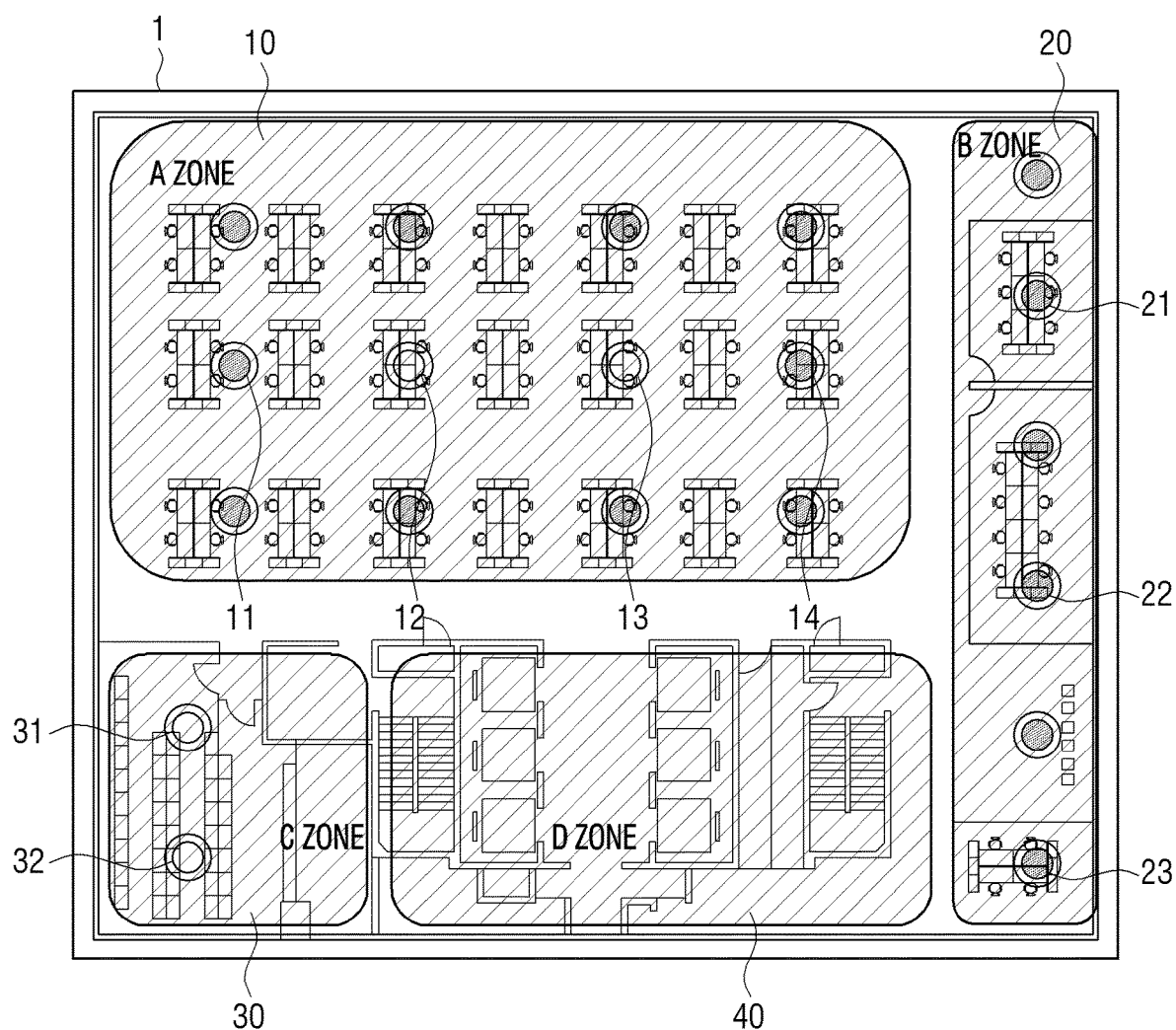
FIG. 6 is a diagram illustrating a general mode according to an embodiment of the disclosure.

FIG. 6 is a diagram illustrating a general mode according to an embodiment of the disclosure.

Referring to FIG. 6, a plurality of air conditioner 200 operating in partial control modes is illustrated. If the total power consumption is lower than the set power value, the server 100 can change the power peak control mode to partial control mode.

According to an embodiment of the disclosure, the partial control mode may be a method for controlling the air conditioner 200 to satisfy the comfort level of a space with a high priority on the basis of priority information of the plurality of spaces 1. That is, the server 100 can preferentially convert the air conditioner 200 of a space with a high priority to the cooling mode.

For example, the server 100 can identify that the first priority is the B zone 20, the second priority is A zone 10, and the third priority is C zone 30, based on priority information for a plurality of spaces 1. The server 100 can identify air conditioners 21, 22, 23 capable of converting to a cooling mode among air conditioners arranged in the B zone 20 based on the identified priority. The server 100 can convert the air conditioners 21, 22, 23 to a cooling mode so that the PMV value of the B zone 20 is zero in the target power. If the value of the PMV value of the B zone 20 satisfies 0, the air conditioner of the A zone 10 having the next priority is switched to the cooling mode within a limit that a target power allows and may determine that the PMV value of the A zone become 0. With the same procedure, the PMV value for the C zone 30, which is the next priority, can be identified.

Even if the air conditioner is switched to a cooling mode within the allowable range of the target power, and setting temperature of the air conditioner is adjusted, if the PMV of the B zone 20 does not satisfy zero, the server 100 can control the air conditioner so that the PMV of the B zone 20 satisfies+1. In addition, the air conditioner can be controlled so that the PMV satisfies+1 for the A zone 10 which has the next priority. The same procedure can be performed for the C zone 30.

As shown in FIG. 6, for the B zone 20 having the highest priority, the server 100 may operate air conditioners 21, 22, 23 which are switchable and in which PMV satisfies x to a cooling mode, for the A zone 10, switch some air conditioners 11 and 14 to a cooling mode so that PMV satisfies x+1, and for C zone 30, operate all the air conditioners 31, 32 in a blowing mode or a stopped state.

According to another embodiment, the server 100, when a sum of the PMV of the first space and the PMV of the second space is constant, may select the air conditioner to be switched to the general mode so that a difference between the PMV of the first space and the PMV of the second space is minimized.

For example, if the PMV of the B zone 20 is able to satisfy zero in the allowable range of the target power but the PMV of the A zone 10 does not satisfy+1, the server 100 may adjust the PMV of the B zone 20 to +1, and operate so that the PMV of the A zone satisfies+1.

FIGS. 4 to 6 illustrate a drawing which is configured such that a plurality of spaces 1 are in a layer, but this is merely an example for convenience of description. In implementation, the plurality of spaces 1 may be implemented as a space formed of a plurality of layers.

Figure 7:
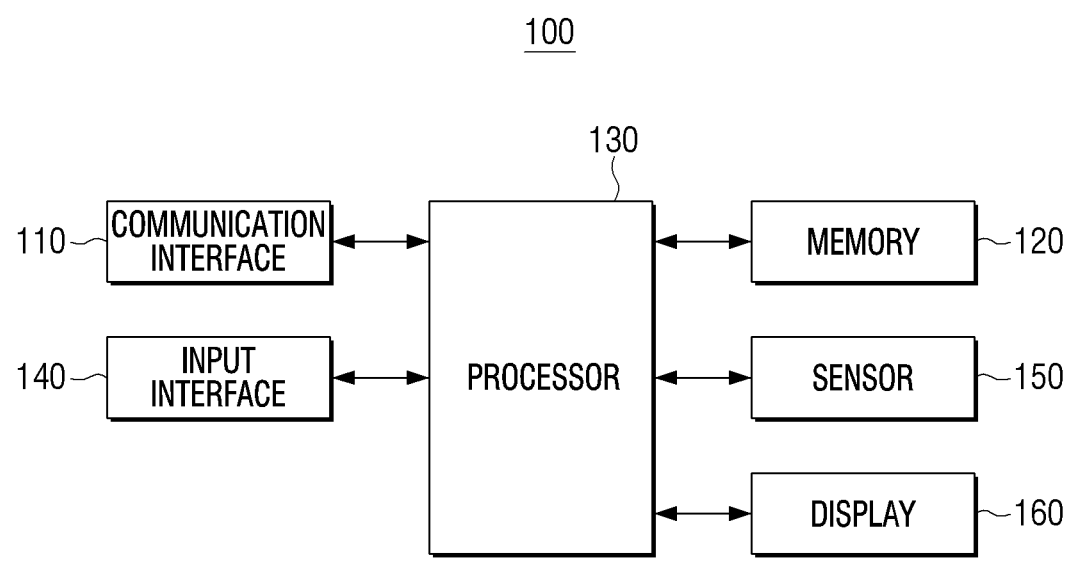
FIG. 7 is a block diagram illustrating a configuration of a server in detail according to an embodiment of the disclosure.

FIG. 7 is a block diagram illustrating a configuration of a server according to an embodiment of the disclosure.

Referring to FIG. 7, the server 100 can include the communication interface 110, the memory 120, the processor 130, an input interface 140, a sensor 150, and a display 160. Meanwhile, the communication interface 110, the memory 120, and the processor 130 shown in FIG. 7 are described in detail in FIG. 2, and thus the redundant description thereof will be omitted.

The input interface 140 may receive user input to control the server 100 or the air conditioner 200. Specifically, the input interface 140 can receive user input for priority of a plurality of spaces. Therefore, the user can set priority for a plurality of spaces according to the use of the space by using the input interface 140. The processor 130 can identify priority information for a plurality of spaces based on the set user input.

The input interface 140 may individually control the operation mode of the air conditioner 200 arranged in a space. For example, the air conditioner 200 in a specific area may be set to operate in a cooling mode all the time.

The input interface 140 may include a touch panel for receiving a user touch using a user hand or a stylus pen, and a button for receiving user manipulation, or the like. In addition, the input interface 140 can be implemented as another input device (e.g., a virtual keyboard, a mouse, a motion inputter, and in particular, a remote controller).

The sensor 150 can sense the object and motion present on the space. Specifically, the sensor 150 may sense physical changes, such as heat, light, temperature, pressure, and sound, to sense the presence and motion of the resident. For example, the sensor 150 may include a Lidar sensor, a Radar sensor, an infrared sensor, an ultrasound sensor, an RF sensor, and a camera, and in particular, can be a motion detection sensor. Specifically, the motion detection sensor is a kind of an active sensor and may use a method for measuring a signal that is returned by transmitting a specific signal.

The sensor 150 may be connected to the server 100 and the air conditioner 200 by wire or wireless and may transmit the detected information about a resident to the server 100. The processor 130 can calculate the resident density for a specific space based on the data sensed by the sensor 150, for example, the number of residents. The processor 130 can identify priority information based on the calculated each spatial resident density.

The sensor 150 may be installed at a location where the plurality of air conditioners are spaced apart from each other and may cover the entire space in which a resident or the air conditioner 200 is present. In the implementation, some of the sensors 230 can be included in an external device to communicate with the server 100, and the server 100 and the external device may perform cooperative sensing between each other.

The display 160 can display various information according to the control of the processor 130. In particular, the display 160 can display operation information of a plurality of air conditioners 200 by the control of the processor 130. Specifically, the display 160 may display operation information including the operation state, the wind direction, the wind speed, and the cooling and heating modes of the air conditioner 200.

The display 160 can display the total power usage of the plurality of air conditioners 200. Specifically, the display 160 can display the power consumption of a plurality of air conditioners 200, and the display 160 may display a target power value or a set power value together to perform real-time monitoring of the total power amount of the air conditioner 200.

The display may be implemented as various types of displays such as a liquid crystal display panel (LCD), light emitting diode (LED), organic light emitting diodes (OLED), liquid crystal on silicon (LCoS), digital light processing (DLP), or the like. In the display (not shown), a backlight unit, a driving circuit which may be implemented as a format such as an a-Si TFT, low temperature poly silicon (LTPS) TFT, organic TFT (OTFT), or the like, may be included as well. The display may be combined with a touch panel and may be implemented with a touch screen, but this is merely and the display can be implemented in a diverse manner.

Figure 8:
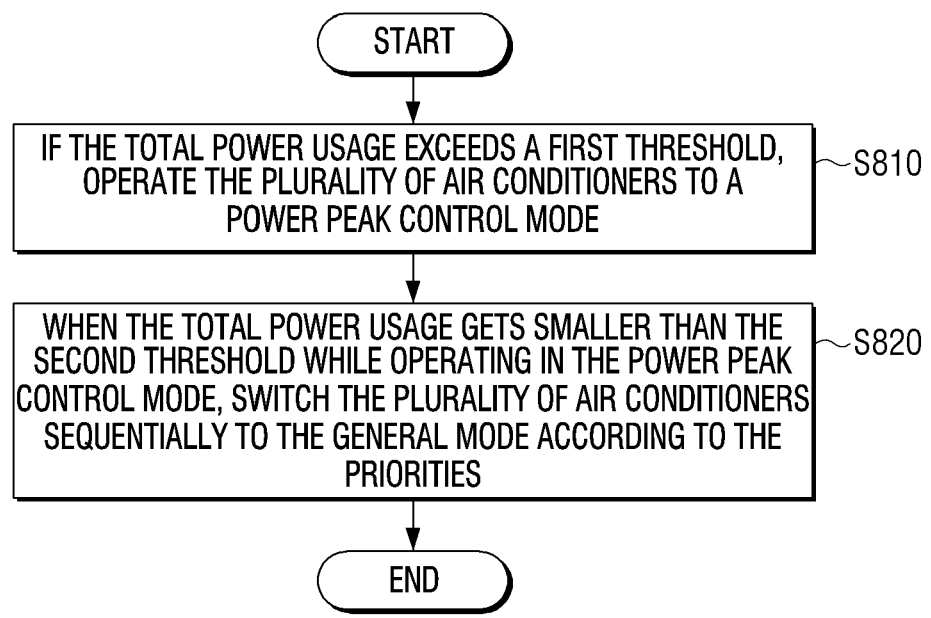
FIG. 8 is a flowchart illustrating a controlling method of a server according to an embodiment of the disclosure.

FIG. 8 is a flowchart illustrating a controlling method of a server according to an embodiment of the disclosure.

Referring to FIG. 8, the server 100 can identify the power consumption of each of the plurality of air conditioners 200 arranged in a plurality of spaces, and identify the total power consumption of the air conditioners 200 based on the power consumption of each air conditioner 200 identified.

If the total power usage of the plurality of air conditioners 200 exceeds a first threshold, the server 100 can operate the plurality of air conditioners 200 in the power peak control mode to reduce the total power consumption of the plurality of air conditioners in operation S810. The first threshold can be a predetermined target power value. The target power value can be pre-set by the user and stored in the server 100.

In other words, the server 100 can determine whether to operate the air conditioner 200 in the power peak control mode based on the target power. The power peak control mode can refer to a mode in which the server 100 limits control of the entire air conditioner 200 and operates the air conditioner 200. The server 100 may control the air conditioner 200 to operate some air conditioners in a stopped state or a blowing mode, and can limit the control authority so that the resident cannot change the air conditioner to the cooling mode.

When the total power usage gets smaller than the second threshold while operating in the power peak control mode, the server 100 may switch the plurality of air conditioners 200 sequentially to the general mode according to the priorities of each of the plurality of spaces in operation S820.

The second threshold may refer to a set power value, and may be a smaller value than the target power value which is the first threshold, and may be a reference for switching some of a plurality of air conditioners 200 to a general mode.

The server 100 may select an air conditioner to be switched to the general mode among the plurality of air conditioners 200 in a range where total power usage of the plurality of air conditioners 200 is less than the first threshold value.

The server 100 may identify a PMV corresponding to each space among the plurality of spaces, and control the air conditioner 200 such that the PMV of a space corresponding to a high priority satisfies a preset value (e.g., 0) based on the priority about a plurality of spaces.

The server 100 can identify priority based on the resident density for the plurality of spaces, or identify priority based on user input. For example, the space with the highest resident density can be identified as the first priority and the first priority may be identified according to a user input.

The server 100 can identify information about the operation mode of each of the plurality of air conditioners 200 in the power peak control mode. That is, the server 100 may grasp whether each air conditioner 200 is operating in a cooling mode in a power peak control mode or a blowing mode.

The server 100 may select an air conditioner to be switched to a general mode based on the identified information on an operation mode and a priority.

Figure 9:
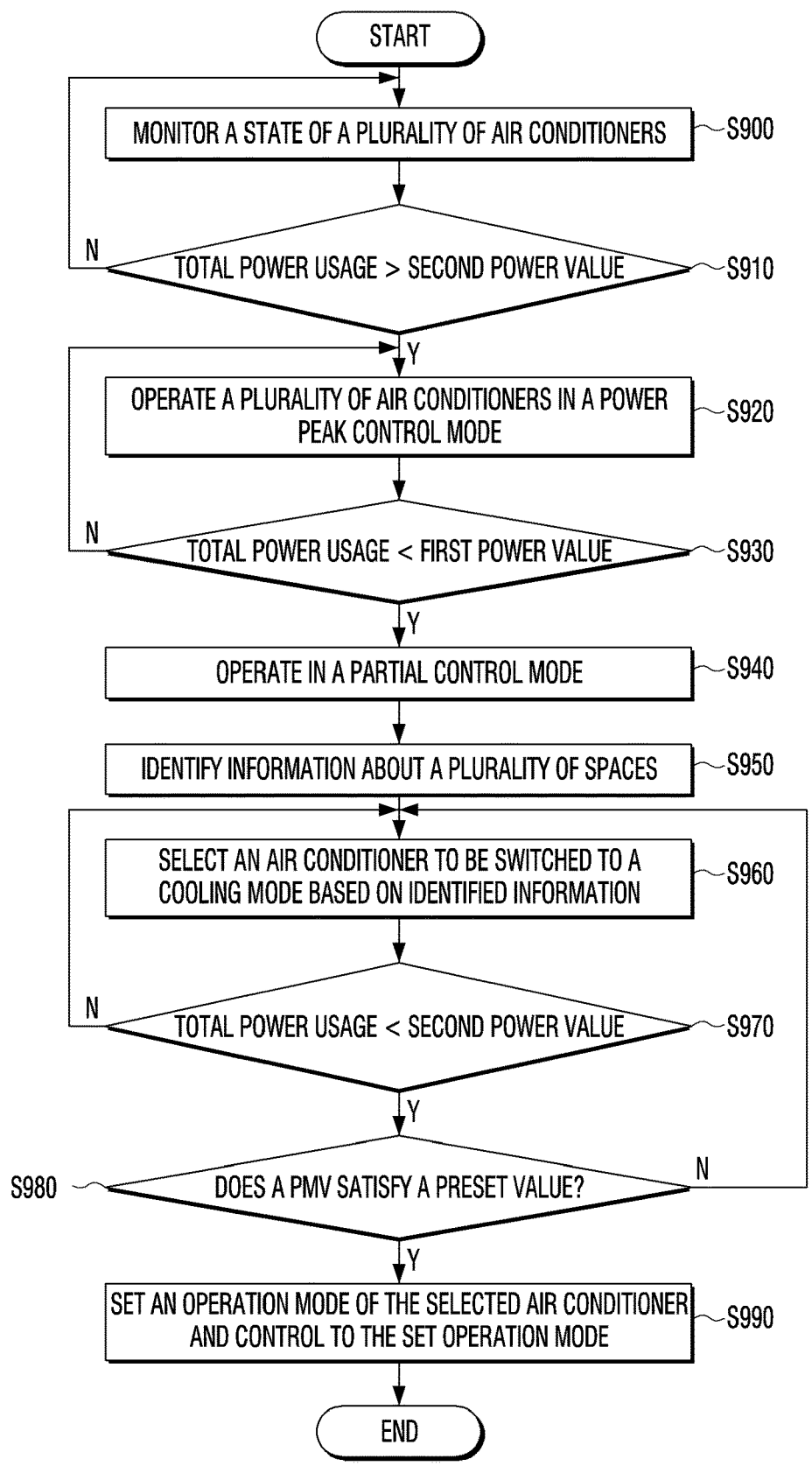
FIG. 9 is a flowchart illustrating a controlling method of a server according to an embodiment of the disclosure.

FIG. 9 is a flowchart illustrating a controlling method of a server according to an embodiment of the disclosure.

Referring to FIG. 9, the server 100 may monitor a state of the plurality of air conditioners 200 in operation S900. The server 100 may monitor operation mode and power consumption of each of the plurality of air conditioners 200.

If the total power consumption of the plurality of air conditioners 200 exceeds the second power value in operation S910-Y, the server 100 can operate the air conditioner 200 in the power peak control mode in operation S920. The second power value may be a reference value in which a first threshold or a power peak control mode is initiated.

When the plurality of air conditioners 200 are controlled in the power peak control mode and the total power consumption of the plurality of air conditioners 200 gets smaller than the first power value in operation S930-Y, the server 100 can operate the plurality of air conditioners 200 in a partial control mode in operation S940. The server 100 can sequentially switch the air conditioner 200 to the general mode according to the priorities of each of the plurality of spaces. The first power value can be a reference value in which a second threshold value or some control mode is initiated, and the general mode can refer to a general state in which the resident can control the cooling and heating mode or the operation stop.

First, the server 100 may identify information about a plurality of spaces in operation S950, and may select the air conditioner 200 to be switched to a cooling mode (or general mode) based on the identified information in operation S960. The information about the plurality of spaces can include a priority of a plurality of spaces, location information for a plurality of air conditioners 200, information of the air conditioner 200 grouped according to a plurality of spaces, and information on the operation mode of the air conditioner 200.

The server 100 may calculate the power consumption of the air conditioner 200 to be converted to the cooling mode to identify whether the total power consumption of the air conditioner 200 satisfies a value smaller than the second power value in operation S970, and may identify whether the PMV of the space with high priority satisfies a predetermined numerical value (e.g., 0) according to the priority in operation S980.

If the total power consumption is less than the first power value in operation S970-Y, and the PMV satisfies a predetermined value in operation S980-Y, the server 100 may set the operation mode of the selected air conditioner 200 and control the air conditioner 200 selected to operate in a set operation mode in operation S990.

According to various embodiments, the server 100 can provide a control method capable of satisfying the user's thermal comfort and maintaining peak demand power below a certain numerical value.

The controlling method of the server 100 can be implemented on a server including the configuration of FIGS. 2 and 7, and can be implemented on the air conditioner 200 including other configurations.

Various embodiments may be implemented as software that includes instructions stored in machine-readable storage media readable by a machine (e.g., a computer). A device may call instructions from a storage medium and operate in accordance with the called instructions, including an electronic apparatus (e.g., air conditioner). When the instruction is executed by a processor, the processor may perform the function corresponding to the instruction, either directly or under the control of the processor, using other components. The instructions may include a code generated by a compiler or a code executable by an interpreter. The machine-readable storage medium may be provided in the form of a non-transitory storage medium. The "non-transitory" storage medium may not include a signal and is tangible, but does not distinguish whether data is permanently or temporarily stored in a storage medium.

The controlling method according to various embodiments can be implemented in an application type installable in an existing air conditioner 200, and may be implemented with software upgrade or hardware upgrade for a management program for an existing air conditioner 200.

Each of the components (for example, a module or a program) according to the embodiments may be composed of one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments, may be performed sequentially, in a parallel, repetitive, or heuristic manner, or at least some operations may be performed in a different order, omitted, or other operations can be added.

While the disclosure has been shown and described above with reference to various embodiments thereof, it will be understood by those skilled in the art that various changes in form and details may be made therein without departing from the spirit and scope of the disclosure as defined by the appended claims and their equivalents.

What is claimed is:

1. A server comprising:
   a communication interface;
   a memory configured to store priorities of each of a plurality of spaces; and
   a processor configured to control a plurality of air conditioners arranged in the plurality of spaces, wherein the processor is further configured to:
   determine a total power usage of the plurality of air conditioners exceeding a first threshold value to control the plurality of air conditioners to operate in a power peak control mode in which control authority for 40% of air conditioners among the plurality of air conditioners placed in a plurality of spaces is restricted to reduce the total power usage, and
   determine the total power usage being less than a second threshold value while operating in the power peak control mode to control the plurality of air conditioners to sequentially switch to a general mode in which the control authority for the air conditioner is free according to a priority,
   wherein the processor is further configured to, based on a sum of a predicted mean vote (PMV) of a first space and a PMV of a second space being constant, select the air conditioner to be switched to the general mode so that a difference between the PMV of the first space and the PMV of the second space is minimized.

2. The server of claim 1, wherein the processor is further configured to select the air conditioner to be switched to the general mode in a range of the total power usage of the plurality of air conditioners being less than the first threshold value.

3. The server of claim 1, wherein the processor is further configured to select the air conditioner to be switched to the general mode so as to the PMV of a space corresponding to a high priority satisfies a preset value, based on the priority.

4. The server of claim 1, wherein the processor is further configured to identify a resident density for the plurality of spaces and identify a priority based on the identified resident density for each space.

5. The server of claim 1, wherein the processor is further configured to receive a user input with respect to the priorities of the plurality of spaces and identify a priority based on the received user input.

6. The server of claim 1, wherein the processor is further configured to:
   identify information about operation modes of each of the plurality of air conditioners in the power peak control mode, and
   select the air conditioner to be switched to the general mode based on the identified information about operation modes and the priority.

7. A method of controlling a server, the method comprising:
   determining a total power usage of a plurality of air conditioners exceeding a first threshold value to operate the plurality of air conditioners to operate in a power peak control mode in which control authority for 40% of air conditioners among the plurality of air conditioners placed in a plurality of spaces is restricted to reduce the total power usage; and
   determining the total power usage being less than a second threshold value while operating in the power peak control mode to sequentially switch the plurality of air conditioners to a general mode in which the control authority for the air conditioner is free according to a priority of a plurality of spaces,
   wherein the sequentially switching to the general mode comprises, based on a sum of a predicted mean vote (PMV) of a first space and a PMV of a second space being constant, selecting the air conditioner to be switched to the general mode so that a difference between the PMV of the first space and the PMV of the second space is minimized.

8. The method of claim 7, wherein the switching to the general mode comprises selecting the air conditioner to be switched to the general mode in a range of the total power usage of the plurality of air conditioners being less than the first threshold value.

9. The method of claim 7, wherein the switching to the general mode comprises selecting the air conditioner to be switched to the general mode so as to the PMV of a space corresponding to a high priority satisfies a preset value, based on the priority.

10. The method of claim 7, wherein the switching to the general mode comprises identifying a resident density for the plurality of spaces and identifying a priority based on the identified resident density for each space.

11. The method of claim 7, wherein the switching to the general mode comprises receiving a user input with respect to priorities of the plurality of spaces and identifying a priority based on the received user input.

12. The method of claim 7, further comprising:
identifying information about operation modes of each of the plurality of air conditioners in the power peak control mode, wherein the switching to the general mode comprises selecting the air conditioner to be switched to the general mode based on the identified information about operation modes and the priority.

* * * * *